Nov. 24, 1953

N. BASHARK 2,660,398

VALVE SEALING ELEMENT

Filed Dec. 29, 1949

INVENTOR.
NICHOLAS BASHARK
BY John N. Wolfram
Agent

Patented Nov. 24, 1953

2,660,398

UNITED STATES PATENT OFFICE 2,660,398

VALVE SEALING ELEMENT

Nicholas Bashark, Dayton, Ohio, assignor to The Parker Appliance Company, Cleveland, Ohio, a corporation of Ohio Application December 29, 1949, Serial No. 135,809

4 Claims. (Cl. 251—167)

This invention relates to valve elements and particularly to the method of attaching a flexible sealing diaphragm to a movable valve sealing element of the type shown and described in the copending application of Wilton Margrave, Ser. No. 15,645, filed March 18, 1948.

It is an object of the invention to provide a movable valve sealing element to which a flexible diaphragm is attached in such a manner as to minimize failure of the diaphragm at the point of attachment due to flexing of the same.

It is another object to provide a movable valve sealing element to which a flexible diaphragm is attached in such a manner that the diaphragm will be clamped across a relatively large area but with a high unit clamping stress at only one portion of the area so that an effective seal may be readily obtained.

It is another object to provide a movable valve sealing element to which a flexible diaphragm is attached in such a manner that the diaphragm will be clamped across a relatively large area and whereby the clamping pressure will vary gradually from a relatively small unit pressure to a relatively high unit pressure.

It is another object to provide a movable valve sealing element to which a flexible diaphragm is sealingly attached by a clamping sleeve and in such a manner that the parts are locked together.

It is another object to provide a metallic valve sealing element to which a flexible rubber-like diaphragm is sealingly attached by a metallic clamping sleeve and wherein the parts are locked together without bringing the clamping sleeve into metal to metal contact with the sealing element.

It is another object to provide a valve sealing element having a tapered bore and an enlargement at the end of such tapered bore and with a flexible diaphragm clamped in said bore by a sleeve, and wherein the sleeve is flared outwardly in the region of the enlargement but to a diameter smaller than the smallest diameter of the tapered bore wherein upon severance of the flexible diaphragm the sleeve may be removed from the bore.

It is another object to provide an annular sealing element having a tapered bore at one end thereof into which a tubular part of a flexible diaphragm may be clamped by a sleeve and in which there is an enlargement extending from the tapered bore to the other end of the annular member so that the latter will present no shoulder against which the sleeve might bottom to prevent proper clamping of the diaphragm.

Other objects of the invention will become apparent from a detailed description and from the drawings, in which.

Figure 1:
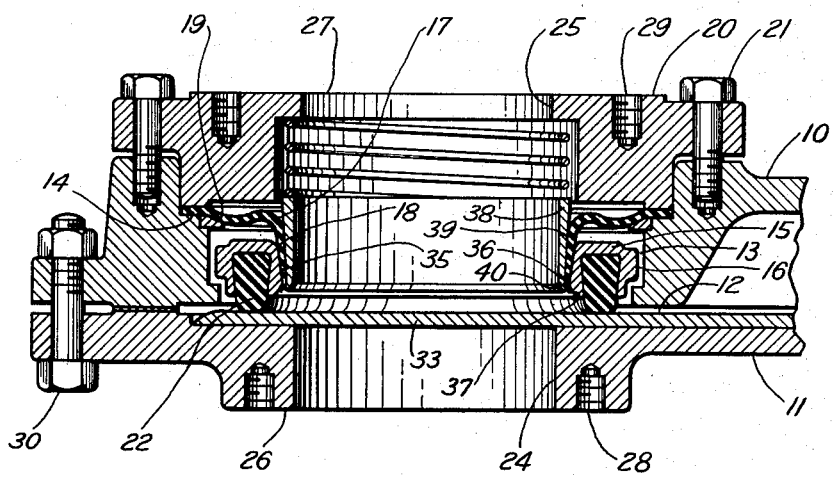
Figure 1 illustrates a fragmentary longitudinal section through a valve utilizing a movable sealing element with a diaphragm attached thereto in accordance with the present invention.

Valve sealing elements with flexible diaphragms attached thereto in accordance with the present invention may be utilized in connection with various types of valves, such as sliding gate valves, rotary plug valves, rotary plate type valves etc. For purposes of illustration, the invention is herein shown in connection with a movable valve sealing element for a sliding gate type valve. Such a valve is illustrated in part in the drawing and includes a body 10 and a cover plate 11 having a valve chamber 12 formed therebetween.

The body 10 has a recess 13 formed therein and in communication with the valve chamber 12 at one end and having a shoulder 14 adjacent the other end. Mounted within the recess 13 is a movable valve sealing element generally designated as 15. This element includes an annular ring 16 to which a flexible diaphragm 17, preferably made of rubber or rubber-like material, is attached. The annular diaphragm 17 has a tubular portion 18 for attachment to the annular ring 16 and it also has a flange portion 19. The outer margin of this flange portion is sealingly clamped against the shoulder 14 by a retaining member 20 which is attached to the body 10 by bolts 21. The annular ring 16 also preferably carries a sealing gasket 22 which projects from one end thereof, but if desired, this gasket may be dispensed with and the ring 16 be provided with an integral sealing end face.

The cover plate 11 and the retainer member 20 have aligned ports 24 and 25 formed therein and include outer sealing surfaces 26 and 27 against which suitable fluid conduit connecting means, not shown, may be attached by means of the threaded portions 28 and 29. The body 10 and cover plate 11 are held together by suitable bolts 30.

Located within the valve chamber 12 is a flat valve plate 33 which may be moved into and out of register with the valve ports 24 and 25 by any conventional valve operating means, not shown. When in the closed position as illustrated in Figure 1, the valve plate 33 is contacted by the sealing gasket 22 of the movable valve sealing element 15 so as to effectively seal against the passage of fluid between the ports 24 and 25. When in open position, the valve plate 33 is withdrawn from its position between the ports 24 and 25 so as to allow the free flow of fluid therebetween.

In order to effectively seal against the passage of fluid around the exterior of the annular ring 16, the flexible diaphragm 17 must be sealingly attached to the annular ring 16 and also sealingly clamped between the shoulder 14 and retainer 20. It is the attachment of the diaphragm to the ring 16 in an effective manner and with minimum possibility of damage to the diaphragm to which the present invention is directed.

Figure 2:
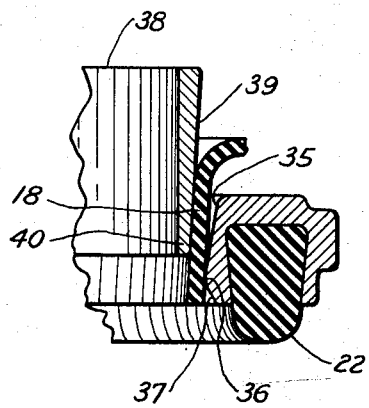
Figure 2 is an enlarged fragmentary section of the movable valve sealing element showing the initial formation of the parts and their loose assembly position before clamping pressure is applied for attaching the diaphragm to the valve sealing element.

As more clearly shown in Fig. 2, the annular ring 16 is tapered on its inner diameter as at 35, with the diameter of the tapered portion being larger at the end opposite the sealing end 22 and decreasing to a minimum diameter at a point 36 intermediate the ends of the annular ring 16. Adjacent the point 36 the inner diameter is tapered in a reverse direction as at 37.

The tubular portion 18 of the flexible diaphragm is inserted within the two tapered sections 35 and 37 of the annular ring 16 and clamped thereagainst by a hollow sleeve 38. The outer face 39 of the sleeve 38 is formed with a taper somewhat less than the taper 35 with the taper 39 initially extending in a straight line to its forward or thin end 40, as shown in Figure 2. The tubular portion 18 of the diaphragm is preferably initially of uniform thickness as shown in Figure 2. To clamp the tubular portion to the annular ring 16 it is first inserted opposite the two tapered portions 35 and 37. The sleeve 38 is then inserted in the tubular portion until its tapered outer face 39 tightly clamps the tubular portion against the taper 35. The parts are so shaped and dimensioned that when the proper clamping action has been achieved, the forward end 40 of the sleeve 38 will be opposite the taper 37 of the annular ring. This portion 40 is then flared over as shown in Figure 1 to press the forward end of the tubular portion 18 of the diaphragm against the taper 37 and thus securely lock the parts together.

In the final position of the parts the end 40 of the sleeve 38 is turned outwardly so as to clamp a portion of the tubular part 36 of the flexible diaphragm against the flared surface 37 but there is no metal to metal contact between the sleeve 38 and the metal ring 16. Likewise, the sleeve end 40 is flared outwardly opposite the flared enlargement 37 only enough to lock the parts together but not enough to cause any portion of the sleeve end 40 to assume a greater diameter than the smallest portion 36 of the tapered bore of the ring 16. In view of the latter, if the sealing assembly should be defective, it is readily possible to slit the end portion of the tubular part of the flexible diaphragm from the lower end of the ring 16 and withdraw the sleeve 38 and the remaining tubular part of the diaphragm without damaging the sealing ring 16. The latter may then be reused on another assembly.

It will further be noted that the bore enlargement provided by a tapered section 37 extends from the point 36 to the lower end of the metallic annular ring 16. This provides a clearance so that there is no danger of the sleeve 38 bottoming with metal to metal contact on any portion of the ring 16 when the sleeve 38 is being inserted into the tapered bore of the ring for clamping the flexible diaphragm.

Because of the slight difference in taper between the inner face 35 of the annular ring and the outer face 39 of the sleeve 38, the portion of the flexible diaphragm clamped therebetween will be pressed into wedge shape, as shown in Figure 1, with the greatest compression occurring in the region of the point 36 and with the amount of compression decreasing progressively toward the outer end of the annular ring 16. Thus the tubular portion is gripped with a relatively high unit stress in the region of the point 36 and with a progressively decreasing unit stress toward the outer end of the ring 16.

The taper 35 is relatively long so that a considerable area of clamping pressure is obtained. By forming the parts so that only a portion of this area is under relatively high unit clamping stress it is possible to obtain a leak-proof connection with less total clamping pressure than if the tubular portion is clamped a uniform amount throughout the clamping area. Also, the fact that the tubular portion is clamped with only a relatively small unit stress at the point adjacent the outer end of the annular ring 16 provides maximum assurance that the diaphragm will not be pinched in two at this point during assembly. Thus if excessive pressure is applied to the sleeve 38 when inserting it within the diaphragm and ring, severance of the tubular portion may occur at the point 36 but is far less likely to occur at the outer end of the ring 16. Since from a practical standpoint it is not possible to inspect the completed assembly for severance of the tubular portion at this point, the relatively long clamping area provided by the taper 35 assures an ample and leak-proof clamping of the diaphragm even if such severance should occur. If so great an assembly pressure is used as to sever the diaphragm at the outer end of the ring 16, this condition can of course be readily detected by inspection and the parts rejected.

Since the tapers 35 and 39 are so formed relative to each other that the diaphragm is clamped with a gradually decreasing stress from the point 36 to the outer end of the ring 16, there is only a slight difference between the clamping stress in the region adjacent the point 36 as at the point 36. Thus even though the diaphragm should be inadvertently severed at the point 36 during assembly, there will still be sufficient clamping stress to effect a fluid seal.

Clamping of the tubular part with only a relatively small unit stress adjacent the outer end of the ring 16 also minimizes the possibility of failure of the diaphragm at this point due to repeated flexing of the flange portion. Changing fluid pressure conditions on either side of the diaphragm will cause the diaphragm to flex. Such flexure will terminate abruptly at the point of attachment to the annular ring 16 with a consequent concentration of stresses at this point. Minimization of the initial stress imposed by the clamping of the diaphragm to the ring permits a maximum of stress to be imposed by flexing action before failure will occur.

I claim:

1. A valve sealing element comprising a ring-shaped sealing member, having a bore therethrough, said bore tapering from a larger diameter at one end of the ring to a smaller diameter at a point intermediate the ends of the ring and having an enlarged portion extending from said smaller diameter to the other end of the member, a flexible diaphragm having a tubular part inserted in the tapered part of said bore and overlapping said enlarged part, a hollow sleeve within said tubular part and clamping said tubular part against said tapered bore, said sleeve having an enlargement opposite the enlarged part of said bore for locking the sleeve and tubular part within the bore of said sealing member.

2. A valve sealing element comprising a ring-shaped sealing member having a bore therethrough, said bore tapering from a larger diameter at one end of the ring to a smaller diameter at a point intermediate the ends of the ring and having an enlarged portion adjacent the small end of the taper, a flexible diaphragm having a tubular part inserted in the tapered part of said bore and overlapping said enlarged part, a hollow sleeve within said tubular part and clamping said tubular part against said tapered bore, said sleeve having an enlargement opposite the enlarged part of said bore for locking the sleeve and tubular part within the bore of said sealing member, the greatest diameter of the sleeve enlargement being smaller than the smallest diameter of said bore.

3. A valve sealing element comprising a ring-shaped sealing member having a bore therethrough, said bore tapering from a larger diameter at one end of the ring to a smaller diameter at a point intermeidate the ends of the ring and having an enlarged portion adjacent the small end of the taper, a flexible diaphragm having a tubular part inserted in the tapered part of said bore and overlapping said enlarged part, a hollow sleeve within said tubular part and clamping said tubular part against said tapered bore, said sleeve having an enlargement opposite the enlarged part of said bore for locking the sleeve and tubular part within the bore of said sealing member, said sleeve enlargement being in contact with said tubular part and out of contact with said enlarged portion of the bore.

4. A valve sealing element comprising a ring-shaped sealing member having a bore therethrough, said bore tapering from a larger diameter at one end of the ring to a smaller diameter at a point intermediate the ends of the ring and having an enlarged portion adjacent the small end of the taper, a flexible diaphragm having a tubular part inserted in the tapered part of said bore and overlapping said enlarged part, a hollow sleeve within said tubular part and clamping said tubular part against said tapered bore, said sleeve having an enlargement opposite the enlarged part of said bore for locking the sleeve and tubular part within the bore of said sealing member, the greatest diameter of the sleeve enlargement being smaller than the smallest diameter of said bore, said sleeve enlargement being in contact with said tubular part and out of contact with said enlarged portion of the bore.

NICHOLAS BASHARK.

References Cited in the file of this patent

UNITED STATES PATENTS

| Number | Name | Date |
| --- | --- | --- |
| 725,275 | McLean | Apr. 14, 1903 |
| 1,705,622 | Mallory | Mar. 19, 1929 |
| 1,949,365 | Baur | Feb. 27, 1934 |
| 2,038,855 | Rosenblad | Apr. 28, 1936 |
| 2,078,903 | Domack | Apr. 27, 1937 |
| 2,243,522 | Conklin | May 27, 1941 |
| 2,308,114 | Schjolin | Jan. 12, 1943 |
| 2,385,420 | Meyer | Sept. 25, 1945 |
| 2,444,714 | Voytech | July 6, 1948 |
| 2,455,658 | Dons et al. | Dec. 7, 1948 |
| 2,485,092 | Gannon | Oct. 18, 1949 |

FOREIGN PATENTS

| Number | Country | Date |
| --- | --- | --- |
| 548,051 | Great Britain | of 1942 |